United States Patent [19]

Fukuda et al.

[11] Patent Number: 4,934,034
[45] Date of Patent: Jun. 19, 1990

[54] TOOL HOLDER ASSEMBLY FOR A PORTABLE MACHINING DEVICE

[75] Inventors: Kenji Fukuda; Yasuo Kazama, both of Tokyo, Japan

[73] Assignee: Nitto Kohki Co., Ltd., Tokyo, Japan

[21] Appl. No.: 354,111

[22] Filed: May 19, 1989

[30] Foreign Application Priority Data

May 23, 1988 [JP]  Japan .............................. 63-67918[U]

[51] Int. Cl.⁵ ...................... B23D 71/04; B23D 51/10
[52] U.S. Cl. .......................................... 29/80; 30/523
[58] Field of Search ...................... 29/80; 30/506, 507, 30/513, 523

[56] References Cited

U.S. PATENT DOCUMENTS

| | | | |
|---|---|---|---|
| 278,935 | 6/1883 | Griffin | 30/513 |
| 1,404,507 | 1/1922 | Adolph | 29/80 |
| 2,612,919 | 10/1952 | Phillips | 30/507 |
| 2,737,704 | 3/1956 | Cinocca | 29/80 |

*Primary Examiner*—William Terrell
*Attorney, Agent, or Firm*—Nixon & Vanderhye

[57] ABSTRACT

A holder for holding a tool to be reciprocated comprising a reciprocating rod having a column-like hollow opened at the front end thereof, a holder piece having first and second ends and inserted into the hollow of said rod, said holder piece further having a split extending from the first end to the second end thereof and into which the tool is attached, and screw holes crossing one of those inner walls which define the split, and screws threadably secured into screw holes to press the side of the tool attached to the split of the holder piece.

5 Claims, 3 Drawing Sheets

TOOL HOLDER ASSEMBLY FOR A PORTABLE MACHINING DEVICE

BACKGROUND OF THE INVENTION

1. Field of the Invention

The present invention relates to a holder for detachably attaching tools such as the sawblade, file and grinding tip, which are reciprocated to achieve grinding or cutting operation, to a certain machining device.

2. Description of the Related Art

In the case of the portable machining device wherein grinding-cutting tools such as the sawblade, file and grinding tip are detachably attached to the head of the device and reciprocated to achieve grinding and cutting operations, the mechanism for attaching these tools to the machining device comprises a split directly formed on the head of the machine and a screw pressing and fixing the tool in the split of the head of the device.

That portion of the sawblade which is attached to the machining device is flat but those of the file and grinding tip are like a rod. Shape and size of their these portions are different depending upon the kinds of them used.

However, shape and size of the split or hole formed directly in the head of the conventional machining device and into which the grinding-cutting tools are attached are fixed and this make it possible for the conventional machining device to be applied to various kinds of tools such as the sawblade, file and grinding tip which are different in shape and size of their portions which are attached to the head of the device.

SUMMARY OF THE INVENTION

The object of the present invention is to provide a holder for detachably attaching various kinds of tools such as a sawblade, file and grinding tip to the head of a machining device, even when said tools are different in shape and size of their portions which are attached to the head of the machining device.

This object of the present invention can be achieved by a holder for detachably attaching tools to be reciprocated comprising a reciprocating rod for reciprocating the tool, having a hollow opening at the front end thereof and in which the tool is held; a holder piece having first and second ends and which is insertable into the hollow of said rod, said holder piece further having a split, extending from the first end to the second end thereof, for receiving the tool, and screw holes crossing one of those inner walls which define the split; and screws threadably secured into the screw holes to press one side of the tool attached to the spilt of the holder piece.

According to the present invention, there are previously prepared various kinds of holder pieces having splits and holes to match flat and rod-like shapes of those portions of tools such as the sawblade, file and grinding tip which are to be attached to the head of a machining device. When the holder pieces are selected to match a tool, therefore, various kinds of tools such as sawblades, files, and grinding tips which are reciprocated to achieve a grinding or cutting operation can be detachably attached to the head of the machining device.

Further, screws are threadably secured into screw holes of the holder piece, to press the tool in the holder piece at front ends thereof so that the holder piece can be spread centering the split formed in the longitudinal direction thereof. This causes the circumferential face of the holder piece to be pressed against the inner wall of the hollow in the reciprocating rod of the device so that the holder piece can be fixed in the hollow of the rod.

According to the present invention, therefore, various kinds of tools can be detachably attached to the reciprocating rod of a machining device only by selecting the holder pieces to match a tool used.

Further, screws are threadably secured into the holder piece passing through holes of the reciprocating rod to press and fix the holder piece to the hollow in the reciprocating rod of the machining device. Therefore, the system of attaching tools to the machining device can be made simple.

BRIEF DESCRIPTION OF THE DRAWINGS

The drawings show an example of the holder for holding the grinding-cutting tool according to the present invention.

DETAILED DESCRIPTION OF THE PREFERRED EMBODIMENTS

Figures 1, 2:
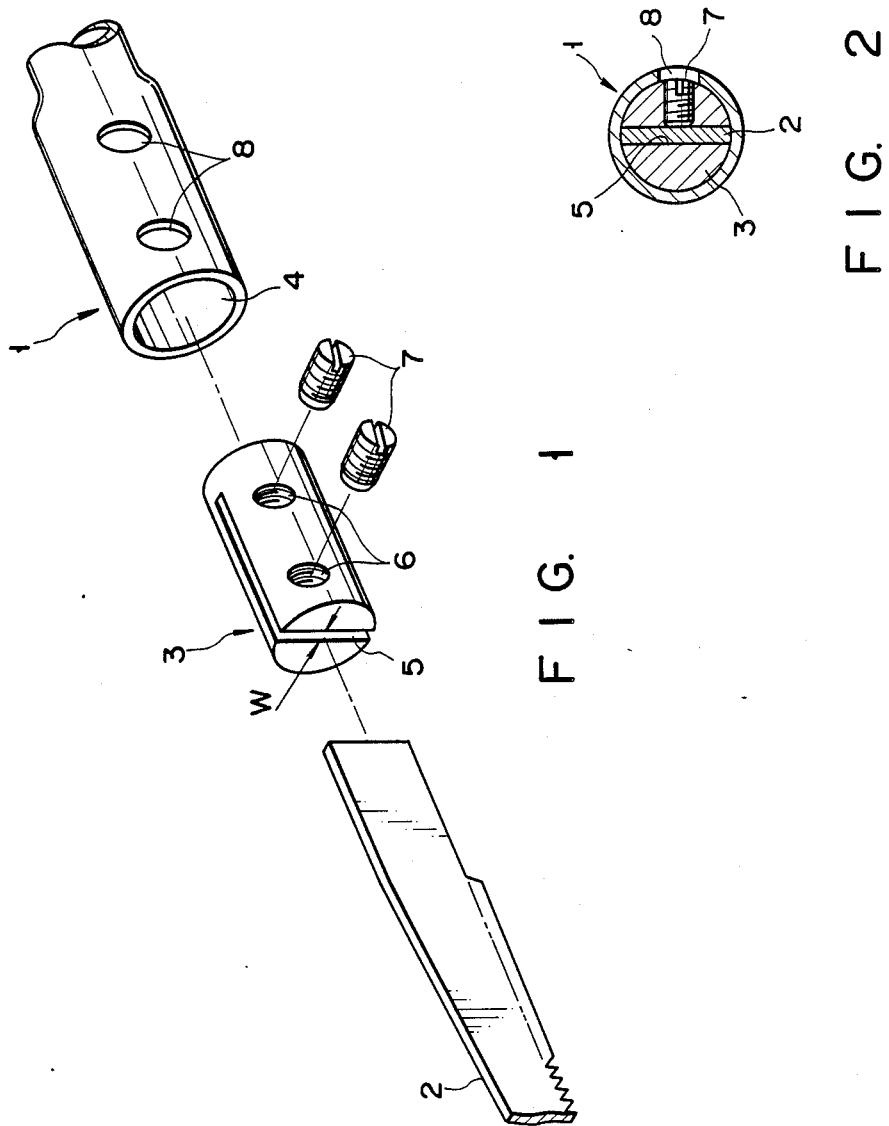
FIG. 1 is an exploded perspective view of a tool-holding assembly according to a first embodiment of the invention, which has a holder piece for mounting a sawblade.
FIG. 2 is a transverse sectional view of the assembly of FIG. 1, showing a state where the sawblade is mounted.

Reference numeral 1 represents a tool attaching head. This head is formed like a rod reciprocated by an electric or air motor (not shown) and various kinds of grinding-cutting tools 2, 2' such as the sawblade, file and grinding tip which are reciprocated to achieve grinding and cutting operation are detachably attached to head 1.

Tool attaching head 1 has an opening 4 at the foremost end thereof into which column-like holder piece 3 is fitted. Holder piece 3 shown in FIG. 1 is intended for flat tools such as the sawblade and it is provided with a groove or split 5 having flat parallel inner walls in the longitudinal direction of holder piece 3. Width W of the groove or split 5 is set slightly wider than the thickest of flat tools 2 such as the sawblade used.

A pair of female screws 6 directed perpendicular to split 5 and communicated with split 5 are formed in holder piece 3, passing through a half of holder piece 3 divided by split 5. Push screws 7 can be screwed into female screws 6. Tool attaching head 1 is provided with a pair of holes 8 through which heads of push screws 7 are projected. A slot may be formed instead of these holes 8.

Tool 2 is inserted into split 5 of holder piece 3 and holder piece 3 is then fitted into hollow 4 of tool attaching head 1. Push screws 7 are screwed into female screws 6 through holes 8. When screws 7 are further screwed into female screws 6, they press and fix tool 2 against the inner walls of split 5. When tool 2 is pressed by screws 7 in this manner, holder piece 3 which is subject to the reaction force of tool 2 pressed by push screws 7 is elastically spread, centering split 5 thereof, so that the outer circumference of holder piece 3 can be pressed and fixed against the inner circumference of hollow 4 of tool attaching head 1. Tool 2 can be thus fixed to head 1.

Figure 3:
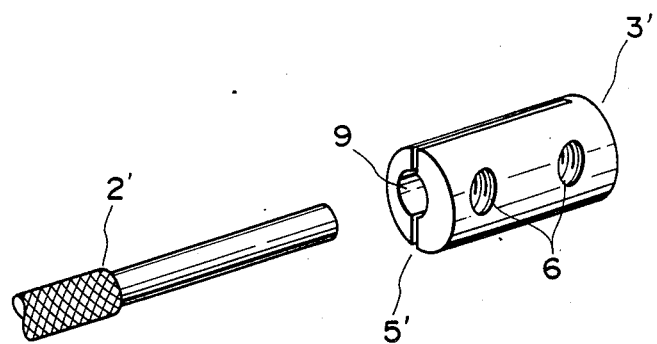
FIG. 3 is a partial exploded perspective view of a tool-holder assembly according to a second embodiment of the invention, which has a holder piece for mounting a file.
Figure 4:
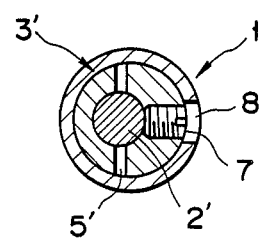
FIG. 4 is a transverse sectional view of the assembly of FIG. 3, showing a state where the file is mounted.

Holder piece 3' shown in FIG. 3 is intended for tools 2' such as the file and grinding tip shaped like rod at those portions which are inserted into holder Piece 3'. Holder piece 3' is same in shape as the above-described one 3 and the groove or split 5' which is formed in the axial direction of holder piece 3' is shifted or offset from the center of holder piece 3' to prepare a margin thick enough for the thread of each of female screws 6. Hole 9 into which tool 2' can be inserted is formed in the center of split 5'. The diameter of hole 9 is set slightly larger than the largest diameter of those rod-like portions of tools 2' which are inserted into hole 9.

Also in the case of holder piece 3' similar to the holder piece 3, tool 2' is inserted into split 5' of holder piece 3' and holder piece 3' is then fitted into hollow 4 of tool attaching head 1. When push screws 7 are screwed into female screws 6 and further screwed into female screws 6, they press and fix tool 2' against the inner circumference wall of hole 9 which is integral to split 5', so that the outer circumference of holder piece 3' which is elastically spread centering split 5' thereof can be pressed and fixed against the inner circumference to hollow 4 of tool attaching head 1. Tool 2' can be thus fixed to tool attaching head 1.

Figure 5:
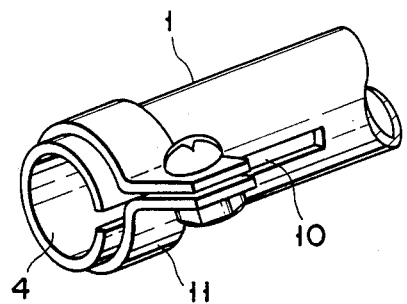
FIG. 5 is a perspective view of a tool-attaching head of the tool-holder assembly according to a third embodiment of the invention.
Figure 6:
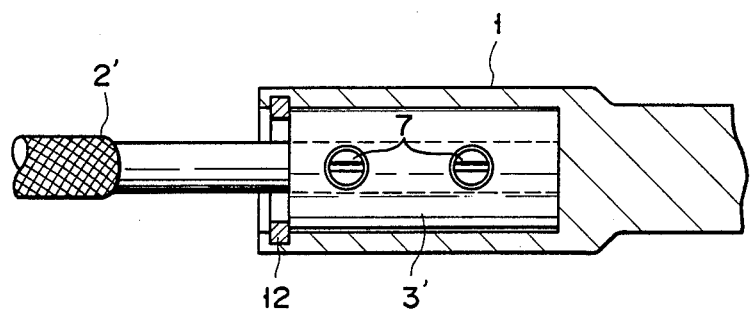
FIG. 6 is a longitudinal sectional view of a tool-holder assembly according to a fourth embodiment of the invention, showing a state where the file is mounted.

The fixing of holder piece 3 or 3' to head 1 is not limited to the manner of spreading holder piece 3 or 3' along split 5 or 5' by the action of screws 7 inserted through holes 8 to press and fix holder piece 3 or 3' against the inner circumference of hollow 4 in head 1. As shown in FIG. 5, it may be arranged that slit 10 is formed at the front end of head 1 and that this front end of head 1 is clamped by clamp band 11. Alternatively, stop ring 12 may be used, as shown in FIG. 6, in which case, however, a means is added to prevent holder piece 3' from being rotated. Still other suitable means may be employed.

What is claimed is:

1. A tool-holder assembly for a portable machining device comprising:
    a tool-attaching member having an opening at a forward end thereof and at least one through hole, said tool-attaching member being adapted for axial reciprocation by driving means;
    a holder piece having a groove formed for receiving said tool, and comprising two portions defined by said groove, one of said two portions having at least one screw hole formed therethrough and aligning with said at least one through hole, said holder piece being adapted to be fitted in said opening of said tool-attaching member; and
    at least one screw to be threaded in said at least one screw hole when said holder piece is inserted in said opening, and with said tool fitted in said groove, for urging said tool against the other of said two portions,
    said two portions being urged by said screw away from each other, thereby pressing said holder piece into frictional engagement with said tool-attaching member so that said holder piece maintains said tool axially immovable relative to said tool-attaching member.

2. The holder according to claim 1, wherein said groove is offset from the axial center line of the holder piece.

3. The holder according to claim 2, wherein said holder piece is provided with a cylindrical hole formed parallel to the axial center line of the holder piece and in the center of the groove thereof so that a handle portion of the tool can be inserted into the hole.

4. The holder according to claim 1, further comprising a groove extending from the front end of the rod in the axial direction thereof to communicate the opening with outside and a clamp band attached to that portion of the rod where the slit is located.

5. The holder according to claim 1, further comprising a stop ring for fixing the holder piece fitted into the opening of the rod.

* * * * *